United States Patent
Inokuchi

(12) 
(10) Patent No.: US 6,376,078 B1
(45) Date of Patent: Apr. 23, 2002

(54) SPHERICAL FINE PARTICLES OF SILICONE RESIN

(75) Inventor: Yoshinori Inokuchi, Gunma-ken (JP)

(73) Assignee: Shin-Etsu Chemical Co., Ltd, Tokyo (JP)

( * ) Notice: Subject to any disclaimer, the term of this patent is extended or adjusted under 35 U.S.C. 154(b) by 0 days.

(21) Appl. No.: 09/584,964

(22) Filed: Jun. 2, 2000

(30) Foreign Application Priority Data

Jun. 3, 1999 (JP) .......................................... 11-156277

(51) Int. Cl.$^7$ ................................................. B32B 5/16
(52) U.S. Cl. ........................ 428/403; 428/405; 428/407; 427/212; 427/213.36; 427/387
(58) Field of Search ................................. 428/403, 405, 428/407; 427/212, 213.36, 387

(56) References Cited

U.S. PATENT DOCUMENTS

| | | | | |
|---|---|---|---|---|
| 4,395,461 A | * | 7/1983 | Ching | ........................ 428/412 |
| 4,499,224 A | * | 2/1985 | Anthony | ...................... 524/261 |
| 6,007,918 A | * | 12/1999 | Tan | .............................. 428/451 |
| 6,010,791 A | * | 1/2000 | Tan | .............................. 428/451 |

* cited by examiner

*Primary Examiner*—Leszek Kiliman
(74) *Attorney, Agent, or Firm*—Millen, White, Zelano & Branigan, Plc.

(57) ABSTRACT

Disclosed are spherical particles of a polyorganosilsesquioxane resin have a unique optical properties when each particle has a core-cladding composite structure consisting of a core portion of, for example, a polymethylsilsesquioxane resin and a cladding layer of, for example, a polyphenylsilsesquioxane resin having refractive indices differing by at least 0.02, the diameter of the core portion being in a specified range relative to the diameter of the whole particle. Such particles of a core-cladding structure can be prepared by conducting the hydrolysis-condensation reaction of organotrialkoxysilanes, e.g., methyl trimethoxysilane and phenyl trimethoxysilane, in two successive steps by using different silane compounds or by using silane mixtures of different mixing proportion in the first and second step reactions.

20 Claims, No Drawings

SPHERICAL FINE PARTICLES OF SILICONE RESIN

BACKGROUND OF THE INVENTION

The present invention relates to spherical fine particles of a silicone resin or, more particularly, to spherical fine particles of a silicone resin having usefulness as an additive in plastic resins to impart slipperiness, antiwearing resistance and light-diffusibility, as a blocking inhibitor in plastic films, as a surface lubricity improver in coating compositions, as an extender, lubricity improver and water repellent agent in cosmetic preparations and polishing waxes, polisher agent in cleaning compositions and so on.

As is known, various methods have been proposed heretofore for the preparation of fine particles of a polyorganosilsesquioxane resin. Some of the methods therefor include a method disclosed in Belgian Patent 572412 in which ethyl trichlorosilane is hydrolyzed and subjected to a hydrolysis-condensation reaction in water, a method disclosed in Japanese Patent Publication 40-16917 in which a methyl trialkoxy silane is hydrolyzed and subjected to a condensation reaction in an aqueous solution of an alkaline earth hydroxide or an alkali carbonate, a method disclosed in Japanese Patent Publication 2-22767 in which a methyl trialkoxy silane is hydrolyzed and subjected to a condensation reaction in an aqueous solution of ammonia or an organic amine compound followed by heating of the reaction mixture at 70 to 80° C. to promote the condensation reaction and then the product is washed with water and finely pulverized, a method disclosed in Japanese Patent Kokai 1-217039 in which an alkyl trialkoxysilane, of which the alkyl group has 1 to 6 carbon atoms, is hydrolyzed in the presence of an organic acid and then subjected to a condensation reaction in an alkaline aqueous solution and a method disclosed in Japanese Patent Kokai 4-202325 for the preparation of a polyorganosilsesquioxane resin having, besides methyl groups, long-chain alkyl groups, phenyl groups and alkyl groups substituted by a functional group.

The fine particles of the polyorganosilsesquioxane resins disclosed above are currently under practical use as an additive in plastic resins to impart slipperiness, antiwearing resistance and light-diffusibility, as a blocking inhibitor in plastic films, as a surface lubricity improver in coating compositions, as an extender, lubricity improver and water repellent agent in cosmetic or toiletry preparations and polishing waxes, polisher agent in cleaning compositions and so on. While some problems are left to be solved that incorporation of the particles is detrimental against transparency of the base material, whitening of the base material is unavoidable due to irregular reflection of light on the particle surfaces and, in certain applications, the efficiency of light reflection is decreased on the surface of the base material.

On the other hand, improvements for these defects are proposed heretofore. For example, Japanese Patent Kokai 2-163127 discloses spherical fine particles of a polymethylsilsesquioxane resin having modified surfaces in which organic groups having functional groups such as alkenyl groups, phenyl groups, epoxy groups, acryloxy groups and amino groups are bonded to the polymethylsilsesquioxane molecules on the surface of the resin particles. Further, Japanese Patent Kokai 4-122731 discloses fine particles of a polyorganosilsesquioxane consisting of a core portion formed from polymethylsilsesquioxane units and a surface layer formed from perfluoroalkyl silsesquioxane units. The improvements obtained in these products, however, are limited because the modification is effected only in the composition of the surface portion so that the problems above mentioned relative to the optical properties of the particles remain unsolved.

SUMMARY OF THE INVENTION

The present invention accordingly has an object, in view of the above described problems and disadvantages relative to the conventional fine silicone resin particles, to provide novel spherical fine particles of a silicone resin free from the problems that, when incorporated into a variety of base materials, the transparency of the base material is decreased and the base material is imparted with a whitened appearance due to irregular reflection of light on the silicone resin particles or, in some cases, the efficiency of light reflection is rather decreased as well as to provide a method for the preparation of such improved spherical fine particles of a silicone resin.

Thus, the present invention completed as a result of the extensive investigations undertaken by the inventor with the above mentioned objects, provides spherical fine particles of a silicone resin consisting of methyl silsesquioxane units and phenyl silsesquioxane units and having an average particle diameter in the range from 0.1 to 50 μm, of which each particle has a composite structure consisting of a core portion of a first silsesquioxane resin and a cladding layer of a second silsesquioxane resin, the molar proportions relative to the methyl silsesquioxane units and phenyl silsesquioxane units in the first and second silsesquioxane resins being different each from the other by a factor of at least 0.02.

In consideration of the optical properties of the particles, in particular, it is preferable that the diameter of the core portion of each particle is in the range from 35% to 90% of the overall diameter of the whole particle and that the difference in the average refractive indices between the core portion and the cladding layer of the particles is in the range from 0.02 to 0.20 as a result of the difference in the molar proportion of the methyl silsesquioxane units and phenyl silsesquioxane units in the first and second silsesquioxane resins. Typically, for example, it is preferable that the first silsesquioxane resin forming the core portion consists of the methyl silsesquioxane units alone and the second silsesquioxane resin forming the cladding layer consists of the phenyl silsesquioxane units alone or vice versa so that the cladding layer has a refractive index larger or smaller than that of the core portion.

The above described unique spherical fine particles of a silicone resin having a composite core-cladding structure of the particle can be prepared by a method comprising the steps of dropwise addition of methyl trialkoxysilane, e.g., methyl trimethoxysilane, phenyl trialkoxysilane, e.g., phenyl trimethoxysilane, or a mixture thereof into an aqueous alkaline medium having a pH in the range from 10.0 to 12.5 at a temperature in the range from 0 to 40° C. to effect hydrolysis and condensation reaction of the silane compound or compounds, in which addition of the silane compound is conducted in two successive steps including a first step and a second step each with the silane compound or a mixture of the silane compounds different relative to the molar proportion of the methyl trialkoxysilane and the phenyl trialkoxysilane from the other.

In particular, for example, the first step addition of the silane compound is performed with a methyl trialkoxysilane only and the second step addition is performed with a phenyl trialkoxysilane only so that each of the thus obtained spherical particles consists of a core portion of methyl silsesquioxane resin and a cladding layer of phenyl silsesquioxane resin.

DETAILED DESCRIPTION OF THE PREFERRED EMBODIMENTS

As is described above, the most characteristic feature of the inventive spherical fine particles of a silicone resin is the composite core-cladding structure of the particles while the particles as a whole consists of the siloxane units comprising methyl silsesquioxane units and phenyl silsesquioxane units expressed by the unit formulas of $MeSiO_{3/2}$ and $PhSiO_{3/2}$, respectively, in which Me is a methyl group and Ph is a phenyl group. It is optional that the siloxane units forming the particles further comprise siloxane units of other types such as $Me_3SiO_{1/2}$, $Me_2PhSiO_{1/2}$, $MePh_2SiO_{1/2}$, $Ph_3SiO_{1/2}$, $Me_2SiO_{2/2}$, $MePhSiO_{2/2}$, $Ph_2SiO_{2/2}$ and $SiO_{4/2}$ in a relatively small proportion, for example, not exceeding 20% by moles.

While each of the core portion and the cladding layer of the inventive particles consists of the methyl silsesquioxane units, phenyl silsesquioxane units or a combination thereof, it is essential that the molar proportion of these two types of the silsesquioxane units is different between the core portion and the cladding layer. In view of the object of the invention to obtain silicone resin particles having desirable optical properties, the difference in the molar proportion of the two types of the silsesquioxane units forming the core portion and the cladding layer should preferably be such that the difference in the average refractive indices between the two portions of the particles is in the range from 0.02 to 0.20 or, more preferably, from 0.04 to 0.20. When the difference in the average refractive indices is too small, the optical performance of the particles relative to reflection, refraction, diffusion and so on of light cannot significantly differ from conventional silicone resin particles having a uniform structure. The upper limit 0.20 of the difference mentioned above is given for a practical reason that a difference larger than that cannot be accomplished by the combination of the methyl silsesquioxane units and phenyl silsesquioxane units.

In order for the inventive spherical silicone resin particles to exhibit the most desirable optical performance, it is preferable that the diameter of the core portion is in the range from 35 to 90% or, more preferably, from 45 to 80% of the overall diameter of the whole particle corresponding to a volume fraction of the core portion in the range from 4 to 73% or from 9 to 51%, respectively. When the diameter of the core portion of the particles deviates out of the above mentioned range, the optical performance of the particles relative to reflection, refraction, diffusion and so on of light cannot be significantly different from conventional silicone resin particles of a uniform structure.

Though not particularly limitative, the spherical fine silicone resin particles of the invention should have an average particle diameter in the range from 0.1 to 50 μm or, preferably, from 0.5 to 20 μm. When the particles are too fine or too coarse, the particles are inferior as an additive in a variety of base materials for the improvements of slipperiness, light diffusion, antiblocking behavior, extendibility and polishability. When the particles are too coarse, in addition, the inherent properties of the base material are sometimes adversely affected.

In the following, a typical method for the preparation of the inventive spherical fine particles of a silicone resin is described in detail.

The method for the preparation of organosilsesquioxane particles is well known in the art, in which a trifunctional hydrolyzable silane compound, such as methyl trimethoxysilane and phenyl trimethoxysilane, is added dropwise under agitation to an aqueous alkaline solution to effect hydrolysis and condenation reaction of the silane compound followed by recovery of the precipitates by removing water and methyl alcohol as a by-product of the hydrolysis reaction.

The essential starting material for the preparation of the inventive fine particles comprises also methyl trimethoxysilane and phenyl trimethoxysilane expressed by the structural formulas $MeSi(OMe)_3$ and $PhSi(OMe)_3$, respectively, used either singly or as a mixture thereof. It is optional that these essential starting silane compounds are admixed with a small amount of other hydrolyzable silane compounds, such as trimethyl methoxysilane, phenyl dimethyl methoxysilane, diphenyl methyl methoxysilane, triphenyl methoxysilane, dimethyl dimethoxysilane, phenyl methyl dimethoxysilane, diphenyl methoxysilane and tetramethoxysilane, or a hydrolysis product thereof.

The aqueous medium, to which the above described starting silane compound is added dropwise under agitatio, is alkalified with a water-soluble alkaline compound to serve as a catalyst for promotion of the hydrolysis and condensation reaction. Examples of the water-soluble alkaline compounds include alkali metal hydroxides such as potassium hydroxide, sodium hydroxide and lithium hydroxide as well as ammonia, alkaline earth metal hydroxides such as calcium hydroxide and barium hydroxide, alkali metal carbonates such as potassium carbonate and sodium carbonate and amine compounds such as ethylamine, propylamine, butylamine, pentylamine, dimethylamine, diethylamine, trimethylamine, triethanolamine and ethylenediamine, of which ammonia is particularly preferable in respect of solubility in water, catalytic activity and vaporizability to ensure easy removal from the product powder. Commercial products of ammonia water containing 25 to 30% by weight of ammonia can be used as such.

The alkaline aqueous medium for the hydrolysis reaction of the silane compound should have a pH in the range from 10.0 to 12.5 or, preferably, from 10.5 to 12.0. When the pH value of the aqueous medium is too low, the rate of the hydrolysis-condensation reaction of the silane compound cannot be high enough while, when the pH value is too high, the reaction rate is so high that the fine particles of the precipitated polysilsesquioxane cannot be imparted with a spherical particle configuration.

The temperature of the aqueous medium, at which the hydrolysis-condensation reaction of the starting silane compounds is conducted, should be in the range from 0 to 40° C. or, preferably, from 0 to 25° C. The reaction cannot be undertaken of course at a temperature lower than 0° C. due to freezing of the aqueous medium while, when the temperature is too high, the particles as precipitated would be subject to agglomeration and bonding so that discrete spherical fine particles can no longer be obtained.

The reaction mixture for the hydrolysis-condensation reaction of the starting silane compounds is gently agitated at least until completion of the dropwise addition of the silane compound by using a stirrer having propeller blades, paddle blades and the like in order to ensure uniform dispersion of the silane compound into the aqueous medium. The agitation should not be too vigorous in order to obtain uniform spherical fine particles of the resin.

The total amount of methyl trimethoxysilane and phenyl trimethoxysilane added dropwise to the aqueous reaction medium should be in the range from 5 to 40 parts by weight or, preferably, from 10 to 30 parts by weight per 100 parts by weight of the aqueous alkaline solution as the reaction medium. When the amount of the silane compounds is too small, the productivity of the process is decreased due to handling of an excessively large volume of the reaction mixture for the amount of the product. When the amount of the silane compounds is too large, agglomeration of the resin particles as precipitated takes place not to give uniform and discrete spherical fine silicone resin particles.

The length of time taken for completion of the dropwise addition of the starting silane compounds to the aqueous reaction medium naturally depends on various factors such as the pH value and temperature of the aqueous reaction medium, intensity of agitation and amount of the silane compounds to be reacted. Generally speaking, the rate of dropwise addition of the silane compounds is so controlled as to be completed within 30 minutes to 100 hours. When the rate of dropwise addition of the silane compounds is too high to complete the addition within a too short time, there may be a disadvantage that the desired definite core-cladding structure of the particles cannot be obtained. When the rate of dropwise addition of the silane compounds is too low, agglomeration of the particles as precipitated proceeds not to give discrete spherical particles.

In conducting the hydrolysis-condensation reaction of the trimethoxysilane compounds in an aqueous alkaline reaction medium in the above described manner, it is essential in the present invention that the dropwise addition of the silane compounds is conducted in two successive steps including a first step and a second step by using different silane compounds or silane mixtures differing in the mixing proportion. When the hydrolysis-condensation reaction of the silane compounds is conducted in this way, spherical fine particles of a first polysilsesquioxane resin are formed in the first step, which serve as the core portions for deposition thereon of a cladding layer of a second polysilsesquioxane resin formed in the second step. This is the principle of the inventive method leading to the core-cladding composite structure of the particles. Namely, the first step reaction is conducted with a mixture of methyl trimethoxysilane and phenyl trimethoxysilane in a certain mixing proportion and the second step reaction is conducted with another mixture of the two silane compounds in a mixing proportion differing from that in the first step reaction. It is optional here that methyl trimethoxysilane and phenyl trimethoxysilane are added to the aqueous reaction medium separately but simultaneously instead of addition of a mixture of the two silane compounds. It is of course within the scope of the inventive method that the first step reaction is conducted with methyl trimethoxysilane alone and the second step reaction is conducted with phenyl trimethoxysilane alone or vice versa.

It is preferable in order to obtain spherical fine particles of the polysilsesquioxane resin having a core-cladding composite structure of the particle capable of exhibiting desirable optical properties that the mixing proportions of the two starting silane compounds and the total amounts thereof in the first step and second step reactions are selected in such a way that the difference in the average refractive indices between the core portion and the cladding layer is in the range from 0.02 to 0.20 and the diameter of the core portion is in the range from 35 to 90% of the overall diameter of the whole particle corresponding to a volume fraction of the core portion in the range from 4 to 73%. These parameters can readily be calculated from the true densities and refractive indices of known polysilsesquioxane resins.

Provided that the above mentioned requirements relative to the refractive indices of the polysilsesquioxane resins and the dimension of the core portion are satisfied, it is optional that the hydrolysis-condensation reaction of the silane compounds is conducted in more than two steps by modifying the mixing proportion of the two silane compounds twice or more or modification of the mixing proportion is undertaken continuously during dropwise addition of the silane compounds.

It is preferable in conducting the above described inventive method that agitation of the reaction mixture for the hydrolysis-condensation reaction of the silane compounds is continued for some length of time after completion of dropwise addition of the silane compound to the reaction medium in order to complete the reaction. It is optional that completion of the reaction is accelerated by heating the reaction mixture after completion of dropwise addition of the silane compounds at a moderately high temperature followed, if necessary, by neutralization of the alkaline medium with an acidic compound.

Since the spherical fine particles of a silicone resin prepared in the above described manner are obtained in the form of an aqueous dispersion of the particles, it is usual that the particles are recovered by removing water and methyl alcohol as a by-product from the aqueous dispersion by a known solid-liquid separation method including filtration, centrifugation, decantation, drying by heating under normal or reduced pressure and spray drying. If necessary, the particles are washed with water before drying. When agglomerates are found in the discrete spherical fine particles, it would be necessary that the powder is subjected to disintegration of the agglomerates by using a suitable grinding machine such as jet mills, ball mills and hammer mills. It is further optional when improvements are desired in the water repellency and slipperiness of the spherical fine particles of the silicone resin that the particles are subjected to a surface treatment with a silylating agent, silicone oil, wax, paraffin compound, fluorocarbon compound and the like.

In the following, the inventive spherical fine particles of a silicone resin and the inventive method for the preparation thereof are described in more detail by way of Examples, which, however, never limit the scope of the invention in any way.

EXAMPLE 1

A glass flask of 5 liter capacity was charged with 3672 g of water and 86 g of a 28% ammonia water and the temperature of the solution was controlled at 20° C. The aqueous solution had a pH of 11.6. Under gentle agitation by using a propeller-blade stirrer rotating at 150 rpm and keeping the temperature in the range from 15 to 25° C., the aqueous ammoniacal solution was admixed dropwise first with 403 g of methyl trimethoxysilane taking 100 minutes and then with 339 g of phenyl trimethoxysilane taking 80 minutes to obtain an aqueous dispersion of particles followed by further continued agitation of the reaction mixture for additional 1 hour at the same temperature. Thereafter, the aqueous dispersion under agitation was heated up to a temperature of 55 to 60° C. followed by further continued agitation for 1 hour. The aqueous dispersion of particles was filtered through a pressurizable filter to give a wet cake of about 30% water content, which was dried by heating at 105° C. in an air-circulation drying oven. The dried cake of particles was subjected to disintegration by using a jet mill to give 360 g of discrete dry fine particles of a silicone resin.

The thus obtained fine particles were examined by using an optical microscope to find monodisperse spherical particles which had an average particle diameter of 2.1 $\mu$m as determined by using a particle size analyzer (Model Multisizer II, manufactured by Coulter Electronics Co.) for an aqueous dispersion of the powder in water containing a surface active agent. Further, several aqueous solutions each containing 0.1% by weight of a non-ionic surface active agent and having different but known refractive indices were prepared, in which a small portion of the powder was immersed and examined with an optical microscope to determine the refractive index of the particle which was invisible when the refractive indices of the particle and the aqueous medium were identical. This refraction test indicated that each particle had a composite structure consisting of a core portion and a cladding layer having refractive indices of 1.42 and 1.58, respectively. Calculations were made from the amounts of the methyl trimethoxysilane and phenyl trimethoxysilane used in the respective steps of the reaction and the true densities 1.32 and 1.31 of the resins prepared from methyl trimethoxysilane alone and from phenyl trimethoxysilane alone, respectively, to obtain the ratio 79.4% of the diameter of the core portion to the overall diameter of the whole particle and the volume fraction 50.1% of the core portion in the overall volume of the whole particle.

EXAMPLE 2

The procedure for the preparation of spherical fine particles of a silicone resin having a core-cladding structure was substantially the same as in Example 1 excepting for the replacements of 403 g of methyl trimethoxysilane in the first step reaction with 339 g of phenyl trimethoxysilane and replacement of 339 g of phenyl trimethoxysilane in the second step reaction with 403 g of methyl trimethoxysilane to obtain 370 g of silicone resin particles.

The thus obtained monodisperse fine particles with a spherical particle configuration had an average particle diameter of 4.0 $\mu$m and refractive indices of 1.58 and 1.42 for the core portion and cladding layer, respectively. The ratio of the diameter of the core portion to the overall diameter of the whole particle was 79.5% corresponding to a volume fraction 49.9% of the core portion according to the calculations.

EXAMPLE 3

The procedure for the preparation of the silicone resin particles having a core-cladding structure was substantially the same as in Example 1 except that the amount of methyl trimethoxysilane in the first step reaction was decreased from 403 g to 87 g and the amount of phenyl trimethoxysilane in the second step reaction was increased from 339 g to 655 g to obtain 380 g of the product particles.

The thus obtained monodisperse fine particles with a spherical particle configuration had an average particle diameter of 2.0 $\mu$m and refractive indices of 1.42 and 1.58 for the core portion and cladding layer, respectively. The ratio of the diameter of the core portion to the overall diameter of the whole particle was 46.4% corresponding to a volume fraction 10.0% of the core portion according to the calculations.

EXAMPLE 4

The procedure for the preparation of the silicone resin particles having a core-cladding structure was substantially the same as in Example 1 except that the amount of methyl trimethoxysilane in the first step reaction was decreased from 403 g to 385 g and a mixture of 262 g of methyl trimethoxysilane and 95 g of phenyl trimethoxysilane was used in the second step reaction in place of 339 g of phenyl trimethoxysilane to obtain 320 g of the product particles.

The thus obtained monodisperse fine particles with a spherical particle configuration had an average particle diameter of 2.2 $\mu$m and refractive indices of 1.42 and 1.47 for the core portion and cladding layer, respectively. The ratio of the diameter of the core portion to the overall diameter of the whole particle was 79.6% corresponding to a volume fraction 50.4% of the core portion according to the calculations.

Comparative Example

The procedure for the preparation of silicone resin particles was about the same as in Example 1 except that the hydrolysis-condensation reaction of the silane compounds was conducted in one step by the dropwise addition of a mixture of 403 g of methyl trimethoxysilane and 339 g of phenyl trimethoxysilane into the aqueous medium taking 180 minutes to obtain 340 g of the product particles having an average particle diameter of 1.4 $\mu$m.

The optical microscopic examination of this product indicated monodisperse particles having a spherical particle configuration. The particles did not have a core-cladding composite structure but uniform throughout the whole particle as is indicated by the result of the refractive index measurement giving a uniform value of 1.50.

What is claimed is:

1. Particles of a silicone resin of a spherical configuration having an average particle diameter of about 0.1 to 50 $\mu$m, wherein each particle has a core-cladding composite structure comprising a core portion and a cladding layer thereon, wherein the diameter of the core portion is about 35% to 90% of the diameter of the whole particle, and the core portion is formed from methyl silsesquioxane units and the cladding layer is formed from phenyl silsesquioxane units wherein the difference in the refractive indices between the core portion and the cladding layer is about 0.02 to 0.20.

2. The particles of a silicone resin of a spherical particle configuration as claimed in claim 1 wherein the difference in the refractive indices between the core portion and the cladding layer is about 0.04 to 0.20.

3. The particles of a silicone resin of a spherical particle configuration as claimed in claim 1 wherein the diameter of the core portion is about 45% to 80% of the diameter of the whole particle.

4. The particles of a silicone resin of a spherical particle configuration as claimed in claim 1 wherein the average particle diameter is about 0.5 to 20 $\mu$m.

5. A method for the preparation of particles of a silicone resin of claim 1 which comprises the successive steps of:
    (a) adding dropwise, into an aqueous alkaline medium having a pH of about 10.0 to 12.5, a methyl trialkoxysilane at a temperature of about 0 to 40° C. to form core portions of the particles; and
    (b) adding dropwise, into said aqueous alkaline medium a phenyl trialkoxysilane at a temperature of about 0° C. to 40° C. to form cladding layers on the core portions.

6. The method as claimed in claim 5 in which the methyl trialkoxysilane is methyl trimethoxysilane and the phenyl trialkoxysilane is phenyl trimethoxysilane.

7. The method as claimed in claim 5 wherein the aqueous medium is rendered alkaline by the addition of ammonia.

8. The method as claimed in claim 5 wherein the aqueous alkaline medium has a pH of about 10.5 to 12.0.

9. The method as claimed in claim 5 wherein the temperature of the aqueous alkaline medium is about 0° C. to 25° C.

10. The method as claimed in claim 5 wherein the total amount of organotrialkoxysilanes is about 5 to 40 parts by weight per 100 parts by weight of the aqueous alkaline medium.

11. Particles of a silicone resin of a spherical configuration having an average particle diameter of about 0.1 to 50 μm, wherein each particle has a core-cladding composite structure comprising a core portion and a cladding layer thereon, wherein the diameter of the core portion is about 35% to 90% of the diameter of the whole particle, and the core portion is formed from phenyl silsesquioxane units and the cladding layer is formed from methyl silsesquioxane units wherein the difference in the refractive indices between the core portion and the cladding layer is about 0.02 to 0.20.

12. The particles of a silicone resin of a spherical particle configuration as claimed in claim 11 wherein the difference in the refractive indices between the core portion and the cladding layer is about 0.04 to 0.20.

13. The particles of a silicone resin of a spherical particle configuration as claimed in claim 11 wherein the diameter of the core portion is about 45% to 80% of the diameter of the whole particle.

14. The particles of a silicone resin of a spherical particle configuration a s claimed in claim 11 wherein the average particle diameter is about 0.5 to 20 μm.

15. A method for the preparation of particles of a silicone resin of claim 1 which comprises the successive steps of:

(a) adding dropwise, into an aqueous alkaline medium having a pH of about 10.0 to 12.5, a phenyl trialkoxysilane at a temperature of about 0 to 40° C. to form core portions of the particles; and (b) adding dropwise, into said aqueous alkaline medium a methyl trialkoxysilane at a temperature of about 0° C. to 40° C. to form cladding layers on the core portions.

16. The method as claimed in claim 15 wherein the methyl trialkoxysilane is methyl trimethoxysilane and the phenyl trialkoxysilane is phenyl trimethoxysilane.

17. The method as claimed in claim 15 wherein the aqueous medium is rendered alkaline by the addition of ammonia.

18. The method as claimed in claim 15 wherein the aqueous alkaline medium has a pH of about 10.5 to 12.0.

19. The method as claimed in claim 15 wherein the temperature of the aqueous alkaline medium is about 0° C. to 25° C.

20. The method as claimed in claim 15 wherein the total amount of organotrialkoxysilanes is about 5 to 40 parts by weight per 100 parts by weight of the aqueous alkaline medium.

* * * * *